(12) United States Patent
Fu

(10) Patent No.: US 6,345,653 B1
(45) Date of Patent: Feb. 12, 2002

(54) SNOW CHAINS FOR VEHICLES

(76) Inventor: Yang Chen Fu, PO Box 82-144, Taipei (TW)

( * ) Notice: Subject to any disclaimer, the term of this patent is extended or adjusted under 35 U.S.C. 154(b) by 0 days.

(21) Appl. No.: 09/678,855

(22) Filed: Oct. 4, 2000

(51) Int. Cl.[7] .............................................. B60C 11/00
(52) U.S. Cl. ...................................... 152/219; 152/231
(58) Field of Search ................................ 152/217, 219, 152/231, 239, 241, 242, 213 R, 213 A, 170; 301/42

(56) References Cited

U.S. PATENT DOCUMENTS

| | | | | |
|---|---|---|---|---|
| 1,934,173 A | * | 11/1933 | Vault .......................... | 152/219 |
| 2,620,843 A | * | 12/1952 | Ciborowski ................. | 152/219 |
| 4,263,954 A | * | 4/1981 | Dwinell ....................... | 152/222 |
| 4,832,100 A | * | 5/1989 | Herdeg ................... | 152/213 R |
| 5,167,737 A | * | 12/1992 | Sakuma ...................... | 152/219 |
| 5,318,087 A | * | 6/1994 | Chang Gun ................. | 152/219 |
| 6,092,577 A | * | 7/2000 | Franklin ...................... | 152/219 |

\* cited by examiner

*Primary Examiner*—S. Joseph Morano
*Assistant Examiner*—Long Bao Nguyen
(74) *Attorney, Agent, or Firm*—A & J

(57) ABSTRACT

A snow chain structure includes an inboard flexible cable having an end provided with a male connector and another end provided with a female connector engageable with the male connector, a plurality of outboard flexible cables each having a first end connected with an end of one of the outboard flexible cables by a ring and a second end connected with another one of the outboard flexible cables by an attachment element, the attachment element being an elongated member having two holes each for engaging with an end of a positioning hook, one side of the attachment element being formed with a protuberance, two holes one at a side of the protuberance, and a stop at a bottom of the protuberance, a plurality of cross chains each having an end arranged on the inboard flexible cable and another end fixedly mounted on the outboard flexible cables.

3 Claims, 6 Drawing Sheets

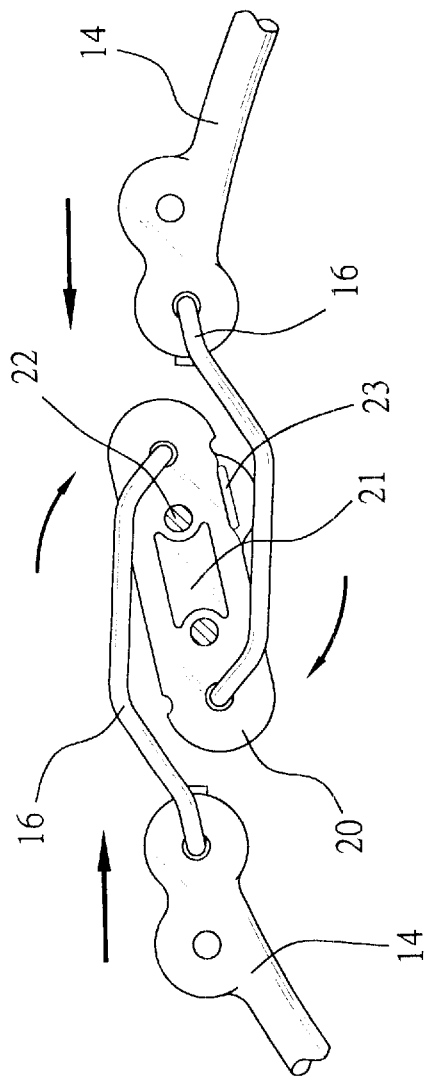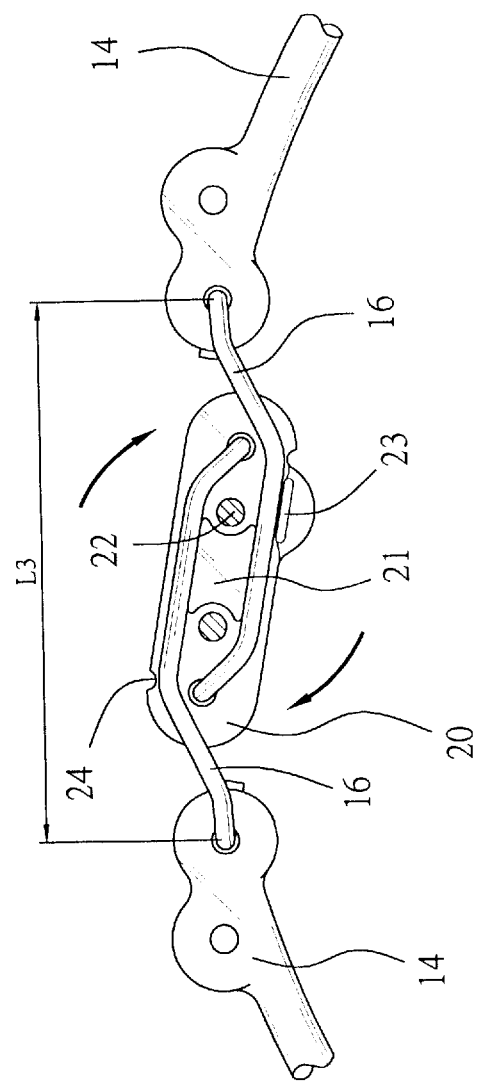
FIG. 6
FIG. 7

SNOW CHAINS FOR VEHICLES

BACKGROUND OF THE INVENTION

1. Field of the Invention

This invention is related to snow chains for vehicles which can be readily connected to fires for providing additional traction during the occurrence of unpleasant weather.

2. Description of the Prior Art

Snow chains are a set of chains tat are fixed around the wheels of a car so that it can drive over snow without slipping. However, it is difficult and time-consuming to tighten snow chains around tires thereby often causing much inconvenience in use. Hence, various attempts have been made in the past for simplifying the mounting of snow chains on a vehicle, but none of them can solve these problems.

Therefore, it is an object of the present invention to provide an improvement in snow chains for vehicles which can obviate and mitigate the above-mentioned drawbacks.

SUMMARY OF THE INVENTION

This invention is related to an improvement in a snow chain structure.

It is the primary object of the present invention to provide a snow chain structure which can be readily connected to a tire for providing additional traction during the occurrence of unpleasant weather.

It is another object of the present invention to provide a snow chain structure which can prevent the attachment from being rotated excessively.

It is a further object of the present invention to provide a snow chain structure which will not become loose during prolonged use.

According to a preferred embodiment of the present invention, a snow chain structure includes an inboard flexible cable having an end provided with a male connector and another end provided with a female connector engageable with the male connector, a plurality of outboard flexible cables each having a first end connected with an end of one of the outboard flexible cables by a ring and a second end connected with another one of the outboard flexible cables by an attachment element, the attachment element being an elongated member having two holes each for engaging with an end of a positioning hook, one side of the attachment element being formed with a protuberance, two holes one at a side of the protuberance, and a stop at a bottom of the protuberance, a plurality of cross chains each having an end arranged on the inboard flexible cable and another end fixedly mounted on the outboard flexible cables.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 4, 5, 6 and 7 illustrate the working principle of the present invention.

DETAILED DESCRIPTION OF THE PREFERRED EMBODIMENT

Figure 1:
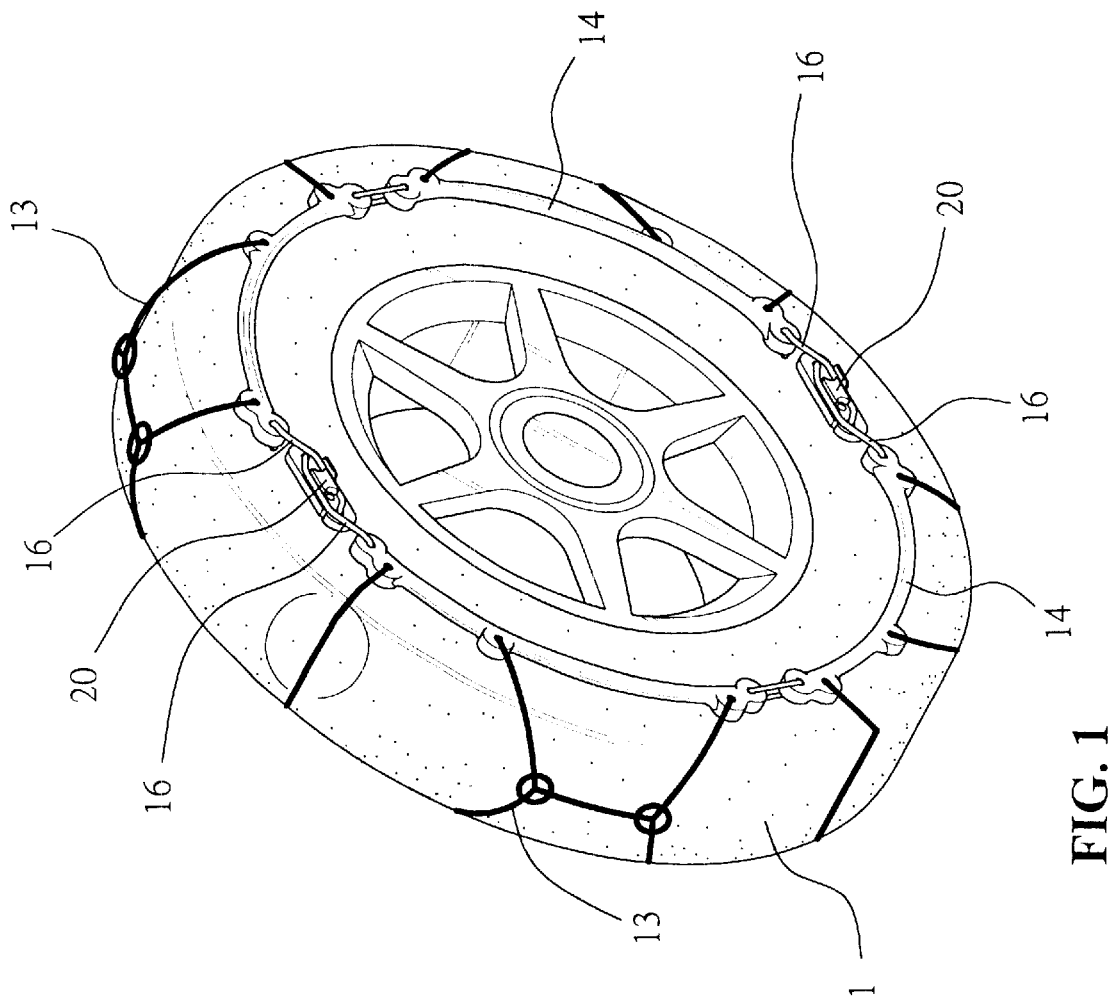
FIG. 1 is a working view of the present invention.
Figure 1A:
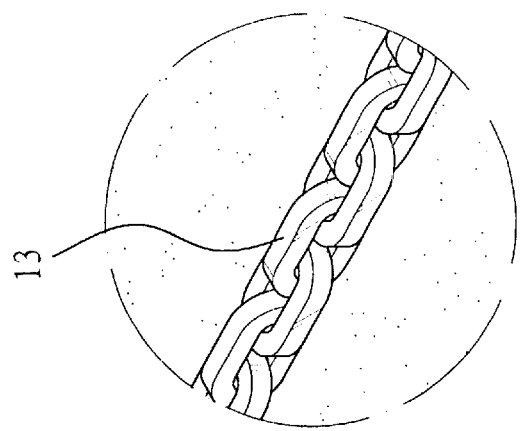
FIG. 1A is an enlarged view of a portion of FIG. 1.
Figure 2:
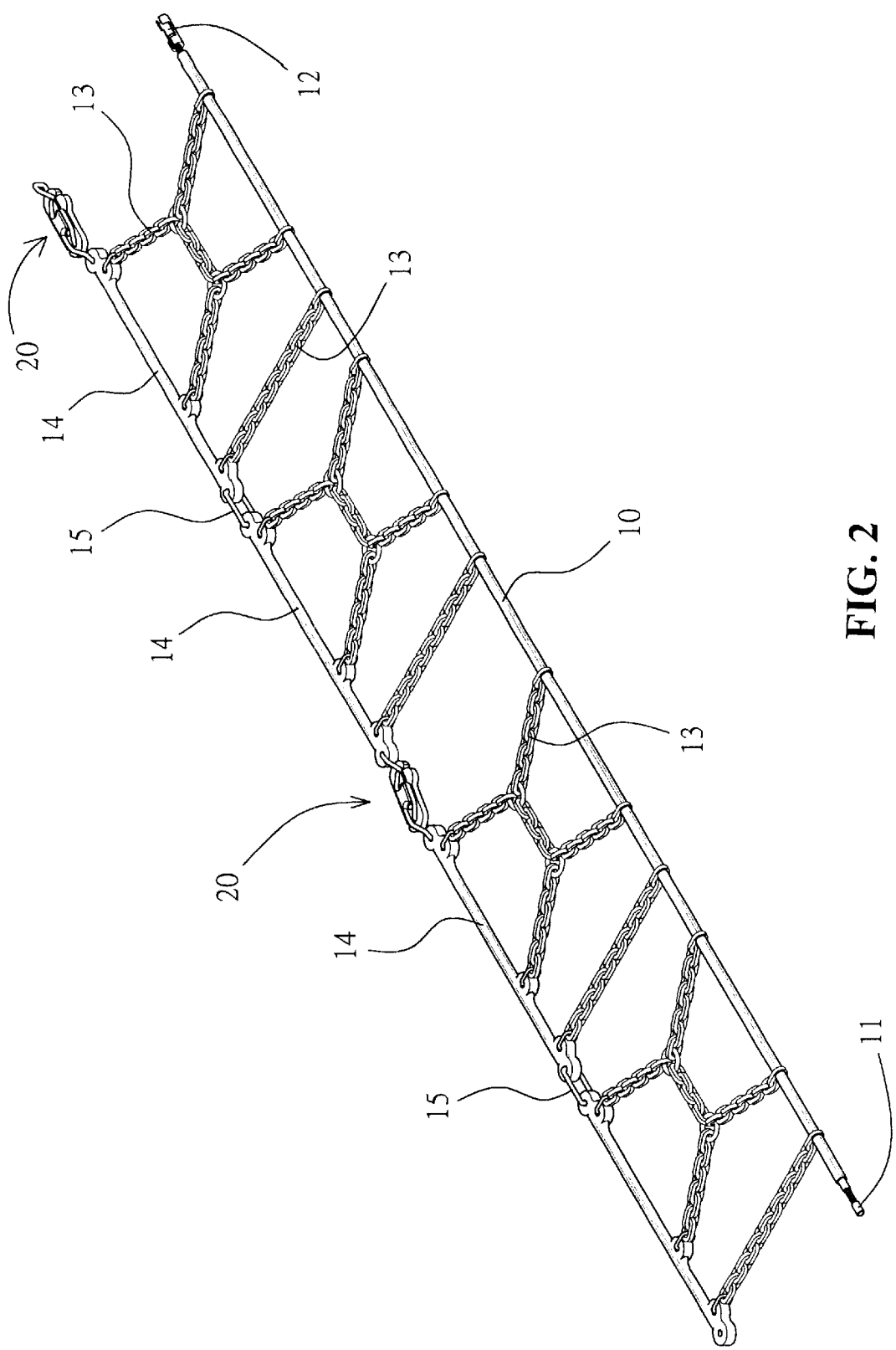
FIG. 2 is a development view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the snow chain structure according to the present invention is intend to be placed about a tire 1.

As shown in FIGS. 1, 1A, 2 and 3, the snow chain structure generally comprises an inboard flexible cable 10, a plurality of outboard flexible cables 14, a plurality of cross chains 13, a plurality of attachment elements 20, and a plurality of positioning hooks 16. The inboard flexible cable 10 extends through an end of each of the cross chains 13 and is provided with a male connector 11 at an end and a female connector 12 at the other which is engageable with the male connector 11.

Every one of the outboard flexible cables 14 is connected with a first outboard flexible cable 14 by a ring 15 at an end and connected with a second outboard flexible cable 14 by an attachment element 20 at the other.

The cross chain 13 has an end arranged on the inboard flexible cable 10 and the other end fixedly mounted on the outboard flexible cable 14.

Figure 3:
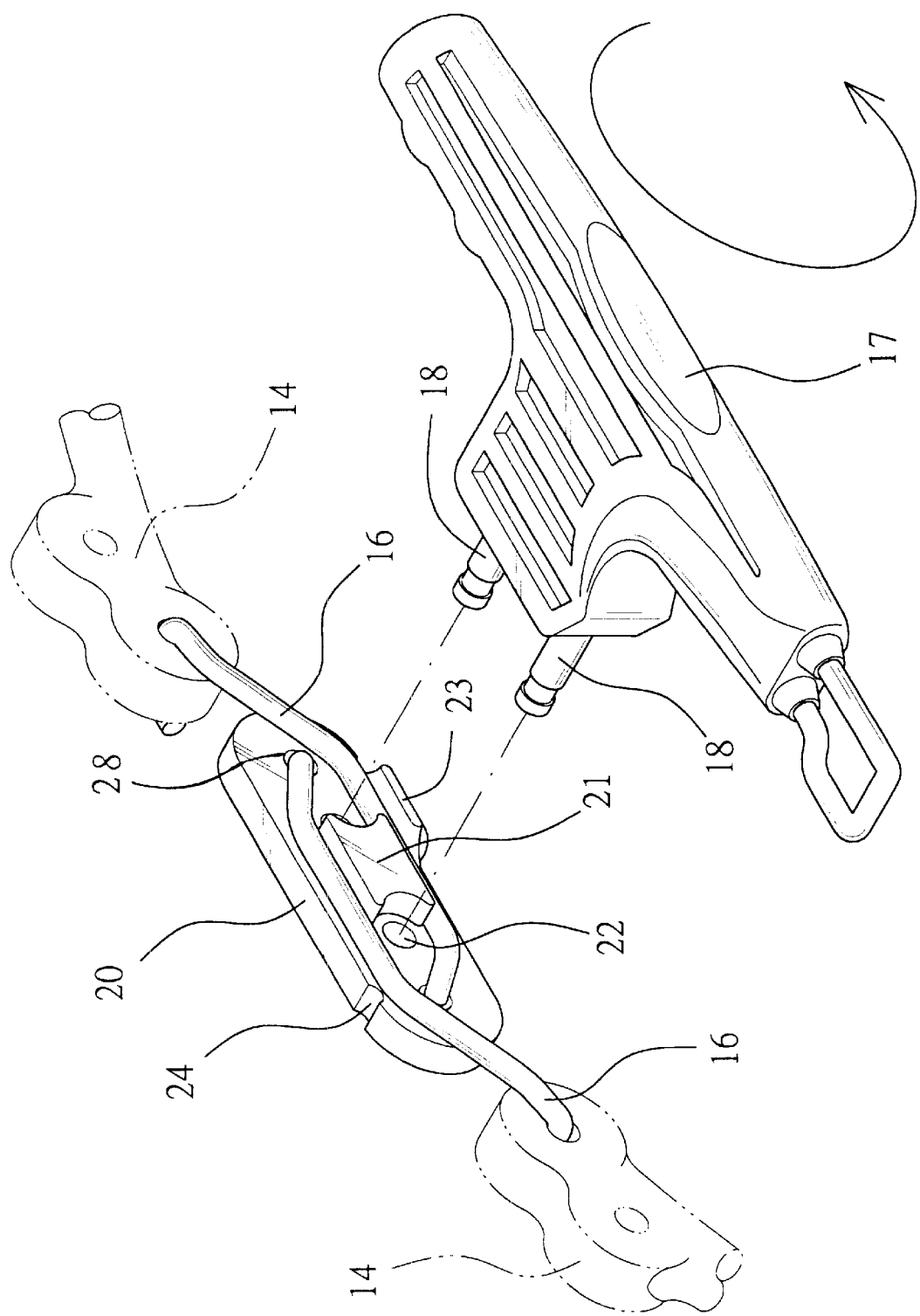
FIG. 3 illustrates how to use the hand tool to turn the attachment element.
Figure 4:
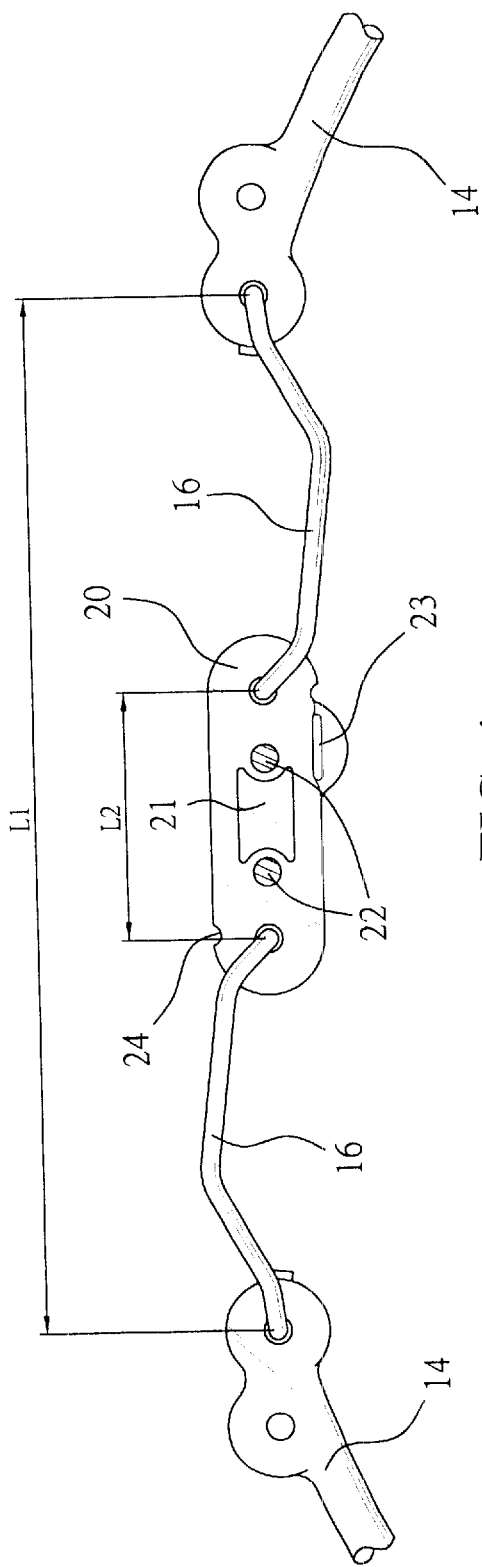
Figure 5:
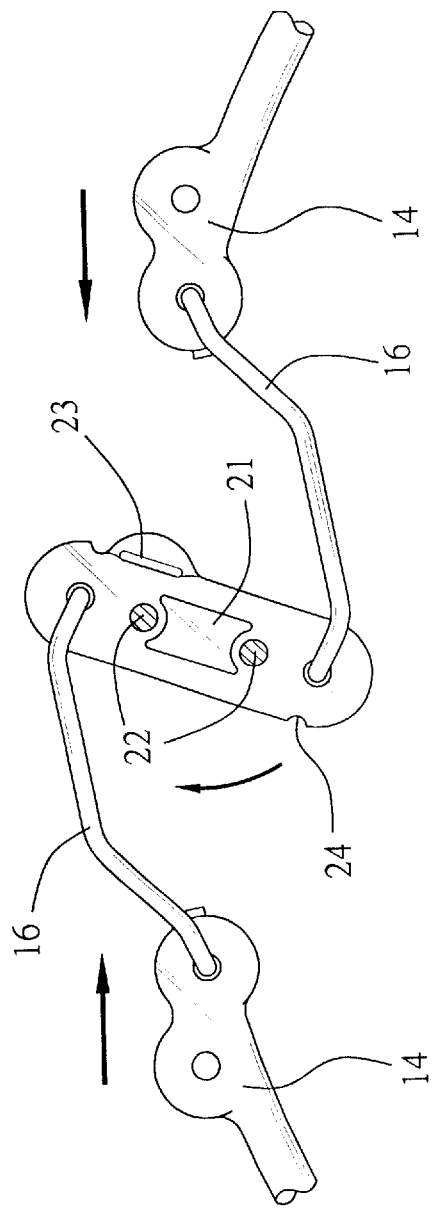

As illustrated in FIGS. 3 and 4, the attachment element 20 is an elongated member 20 having two holes 28 each for engaging with an end of a positioning hook 16. The outer side of the attachment element 20 is formed with a protuberance 21, two holes 22 one at a side of the protuberance 21, and a stop 23 at the bottom When in assembly, the snow chain structure is first placed about a tire 1 with the inboard flexible cable 10 arranged at the inner side with the male connector 11 engaged with the female connector 12 and the outboard flexible cables 14 arranged at the outer side. Thereafter, a hand tool 17 is engaged with the attachment element 20, with two pins 18 of the former inserted into the holes 22 of the latter, and then the hand tool 17 is turned through an angle of 180 degrees so that a positioning hook 16 is engaged with the top of the protuberance 21 and another positioning hook 16 is fitted between the bottom of the protuberance 21 and the stop 23 thereby tightening the snow chain on the tire 1 (see FIGS. 3, 4, 5, 6 and 7).

The positioning hook 16 is curved in shaped so as to enable the attachment element 20 to rotate trough an angle lager than 180 degrees thus strengthening the engagement between the snow chain structure and the tire.

Referring to FIGS. 4 and 7, the distance between two outboard flexible cables 14 is L1 when the attachment element 20 is open. The distance between two outboard flexible cables 14 is equal to L3 when the attachment element 20 is locked. If the distance between two holes 28 of the attachment element 20 is equal to L2, then L3 will be equal to L1-L2-L2. As a result, when the attachment element 20 is locked, the length of the outboard flexible cables in sum will be reduced thereby tightening the snow chain structure on the tire.

Figure 8:
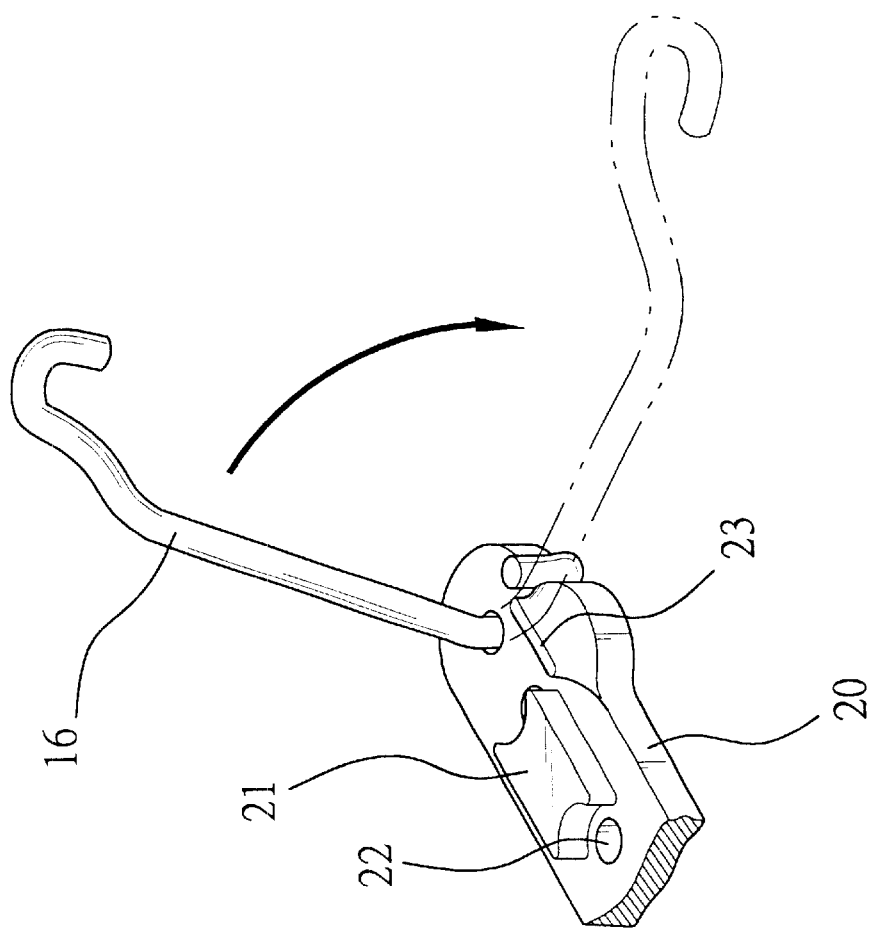
FIG. 8 illustrates the movement of the positioning hook.

As shown in FIG. 8, two ends of the attachment element 20 are semicircular in shape and have a cavity 24 at appropriate positions so that the positioning hooks 16 may engage or disengage with the attachment element 20 via the cavity 24.

When the attachment element 20 is engaged with the positioning hooks 16, the snow chain structure will be tightened on the tire 1 and the stop 23 at the bottom of the attachment element 20 will prevent the positioning hooks 16 from becoming loose.

In conclusion, when the outboard flexible cables 14 are tightened by the attachment elements 20, the inboard flexible cable 10 is also tightened so that the engagement between the male and female connectors 11 and 12 will be firmly tightened. When desired to dismantle the snow chain structure from the tire, it is only necessary to rotate the attachment element 20 in a reversed direction to increase the length of the outboard flexible cables 14 thus enabling the snow chain structure to be easily dismantled from the tire.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A snow chain structure comprising:

an inboard flexible cable having an end provided with a male connector and another end provided with a female connector engageable with said male connector;

a plurality of outboard flexible cables each having a first end connected with an end of one of said outboard flexible cables by a ring and a second end connected with another one of said outboard flexible cables by an attachment element, said attachment element being an elongated member having two holes each for engaging with an end of a positioning hook, one side of said attachment element being formed with a protuberance, two holes one at a side of said protuberance, and a stop at a bottom of said protuberance;

a plurality of cross chains each having an end arranged on said inboard flexible cable and another end fixedly mounted on said outboard flexible cables.

2. The snow chain structure as claimed in claim 1, wherein said positioning hook is curved in shaped so as to enable said attachment element to rotate through an angle larger than 180 degrees.

3. The snow chain structure as claimed in claim 1, wherein said attachment element has two semi-circular ends and two cavities for engagement and disengagement of said positioning hooks with the attachment element.

* * * * *